United States Patent
Kohl et al.

Patent Number: 5,374,886
Date of Patent: Dec. 20, 1994

[54] VOLTAGE REGULATOR FOR AN ALTERNATOR AND METHOD OF REGULATING VOLTAGE GENERATED BY AN ALTERNATOR

[75] Inventors: Walter Kohl, Bietigheim; Friedhelm Meyer, Illingen; Rainer Mittag, Kornwestheim, all of Germany

[73] Assignee: Robert Bosch GmbH, Stuttgart, Germany

[21] Appl. No.: 910,176
[22] PCT Filed: Nov. 5, 1991
[86] PCT No.: PCT/DE91/00857
§ 371 Date: Jul. 10, 1992
§ 102(e) Date: Jul. 10, 1992
[87] PCT Pub. No.: WO92/10019
PCT Pub. Date: Jun. 11, 1992

[30] Foreign Application Priority Data
Nov. 27, 1990 [DE] Germany ............... 4037640

[51] Int. Cl.$^5$ ............................ H02J 7/14
[52] U.S. Cl. ......................... 322/28; 320/35; 320/64; 322/21; 322/33
[58] Field of Search ............... 322/21, 23, 28, 33, 322/72; 320/35, 64

[56] References Cited
U.S. PATENT DOCUMENTS

| 4,342,963 | 3/1982 | Karnowski | 324/431 |
| 4,992,722 | 2/1991 | Maruyama et al. | 322/33 |
| 5,079,716 | 1/1992 | Lenhardt et al. | 320/35 X |

FOREIGN PATENT DOCUMENTS

| 0166162 | 2/1986 | European Pat. Off. |
| 3712629 | 10/1987 | Germany |
| 9013823 | 11/1990 | WIPO |

Primary Examiner—R. J. Hickey
Attorney, Agent, or Firm—Michael J. Striker

[57] ABSTRACT

In a voltage regulator for an alternator which charges a battery via a charging cable and supplies a vehicle mains with voltage, the output voltage is regulated as a function of the temperature of the battery. The voltage regulator has a power part and a control part, which includes a simulation device for storing data and for determining the temperature of the battery, and hence the optimum charging voltage, by simulation from the stored data. Further, the voltage drop between the alternator and battery can be calculated from the alternator current and the resistance of the charging cable while taking into account correction factors which take into account the different connections of the consuming devices between the alternator and the battery so that the calculated voltage drop and the optimum charging voltage for the battery can be used by the voltage regulator to set the voltage delivered to the battery.

9 Claims, 3 Drawing Sheets

VOLTAGE REGULATOR FOR AN ALTERNATOR AND METHOD OF REGULATING VOLTAGE GENERATED BY AN ALTERNATOR

BACKGROUND OF THE INVENTION

The invention relates to a voltage regulator for an alternator. A voltage regulator for an alternator is known which charges a battery via a charging cable and supplies a vehicle mains with voltage. The output voltage of an alternator in a motor vehicle which is used for charging a battery and for supplying the consuming devices in the vehicle is controlled to remain at a constant value with the aid of a voltage regulator. Since the charging voltage required for optimal charging of the battery at low temperatures is higher than that required at high temperatures, the charging voltage and accordingly also the alternator output voltage are adapted to the temperature of the battery. For this purpose it is known e.g. from DE-OS 32 43 075 to measure the temperature of the battery with a temperature sensor which is fastened in the immediate vicinity of the battery and to influence the charging voltage with the aid of the output signal of this temperature sensor. A separate temperature sensor which must be connected by a relatively long cable from the vicinity of the battery to the regulator is disadvantageous. This results in added costs and is troublesome.

Since a drop in voltage which should likewise be taken into account for an optimal charging of the battery, occurs on the charging cable between the alternator and the battery, it is known from DE-OS 32 43 075 to measure the voltage at the positive pole of the battery also. However, an additional sensor and connection cable is required for this.

SUMMARY OF THE INVENTION

It is an object of the present invention to provide an improved voltage regulator of the above-described type, which does not have the above-mentioned disadvantages.

It is also an object of the present invention to provide an improved method of regulating voltage generated by alternator, preferably in a motor vehicle.

According to the invention, a voltage regulator for an alternator connected to a battery via a charging In contrast, the voltage regulator according to the invention cable and to consuming devices to supply the consuming devices with a voltage includes a control means having data storage means for storing data and simulation means cooperating with the data storage means so that a temperature of the battery and/or a voltage drop on the charging cable can be calculated by simulation in the simulation means from the stored data in the data storage means.

The control means advantageously can include a microcomputer having a memory which can provide the data storage means and the voltage can be determined in the control means by a temperature of the battery according to a predetermined relationship between the temperature and the voltage for optimum charging of the battery.

The control means, in a preferred embodiment, also includes a time measuring means for measuring time periods from at least one of a starting and shutdown of the alternator and the simulation means is structured to perform calculations of the temperature of the battery from the stored data in the data storage means and the measured time periods.

Means for determining a temperature of the voltage regulator can, in another embodiment, be included in the control device and the control means can use the determined temperature of the voltage regulator in calculating the temperature of the battery.

In a preferred embodiment of the invention the voltage regulator includes a switching transistor connected to the alternator for controlling an alternator current delivered by the alternator to the battery via the charging cable, means for measuring an alternator rotation speed and means for measuring a pulse-duty factor of the switching transistor. The data storage means is structured to store an alternator current determined from measured values of the alternator rotation speed and the pulse-duty factor and a resistance in the charging cable so that the simulating means can be structured to determine the voltage drop from the resistance in the charging cable and the alternator current.

The invention also includes a method of controlling a voltage supplied to a battery connected to an alternator by a charging cable having a resistance. This method comprises the steps of determining a relationship between a voltage applied to a battery connected to an alternator by a charging cable for charging the battery and a temperature of the battery for optimum charging of the battery; determining at least one of the temperature of the battery and a voltage drop in the charging cable by simulation in a control means from stored data in the control means; and controlling the voltage produced by the alternator according to at least one of the temperature of the battery and the voltage drop so that the voltage applied to the battery is set in accordance with the relationship between voltage and battery temperature determined initially.

In the preferred embodiment of the method both the temperature of the battery and the voltage drop in the charging cable are determined.

The stored data can advantageously include the heating and cooling time constants of the battery and the voltage regulator, and the method advantageously further comprises measuring time from at least one of a starting and shutdown of the alternator for use in the simulation with the time constants.

The method can in a preferred embodiment also advantageously include the steps of measuring an alternator rotation speed and a pulse-duty factor of a switching transistor of a voltage regulator controlling an alternator current of the alternator; determining the alternator current from measured values of the alternator rotation speed and the pulse-duty factor; and determining the voltage drop in the charging cable as a product of the alternator current and a resistance of the charge cable. Other correction factors can be taken into account in determining of the voltage drop.

In contrast, the voltage regulator according to the invention has the advantage that no additional temperature sensor and no additional voltage measuring device are needed, since the temperature of the battery is determined in the regulator itself from data stored in suitable characteristic fields in the regulator. The drop in voltage on the charging cable is likewise determined by means of data stored in suitable characteristic fields and is taken into account in determining the alternator output voltage.

BRIEF DESCRIPTION OF THE DRAWING

The objects, features and advantages of the present invention will now be illustrated in more detail by the following detailed description, reference being made to the accompanying drawing in which.

DETAILED DESCRIPTION OF THE PREFERRED EMBODIMENT

Figure 1:
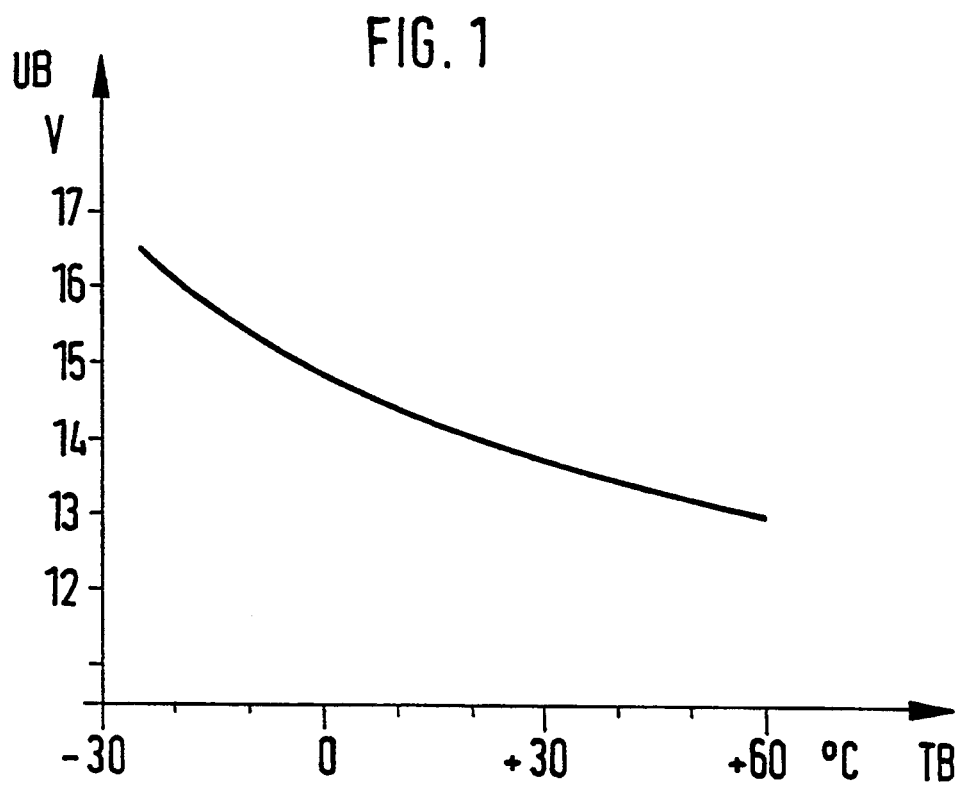
FIG. 1 is a graphical illustration of the relationship between battery voltage and temperature of the battery in optimum charging of the battery.

The dependence of the battery voltage UB on the temperature of the battery TB shown in FIG. 1 corresponds to the predetermined dependence ensuring optimal charging of the battery. To realize such a dependence, some conditions must be met which are explained with reference to the basic wiring diagram shown in FIG. 2.

An alternator driven by an engine of a motor vehicle, not shown, is designated by 10 and is connected with the positive pole of the battery 13 via a charging cable 11 whose resistance is indicated by the resistor 12. The consuming device, symbolized in FIG. 2 by a resistor 14, are connected to the positive pole of the battery 13.

Further, the alternator 10 is connected with a voltage regulator 15 which is composed of a power part 16 and a control part 17. The switching transistor 18 is located in the power part 16, its pulse-duty factor $T_{E/A}$ indicating the ratio of switch-on time to switch-off time of the switching transistor is determined by a sensor 19 and fed to the control part 17 of the voltage regulator 15. Moreover, the rate of rotation NG of the alternator is determined by an additional sensor 20 and likewise fed to the control part 17. The rate of rotation NG can also be determined via an evaluation of the frequency of the indicated alternator voltage of one of the phases u, v, w.

The necessary calculations and time measurements are carried out in a simulation device (PR) in the control part 17 which preferably contains a microcomputer with a time measuring device (TM). Moreover, the data required for the calculations are stored in a data storage device (DS) e.g. for example a memory in the microcomputer. Further, in a known manner, the control part 17 takes over the driving of the switching transistor 18 and accordingly the adjustment of the alternator output voltage via corresponding regulation of the exciting current.

Figure 2:
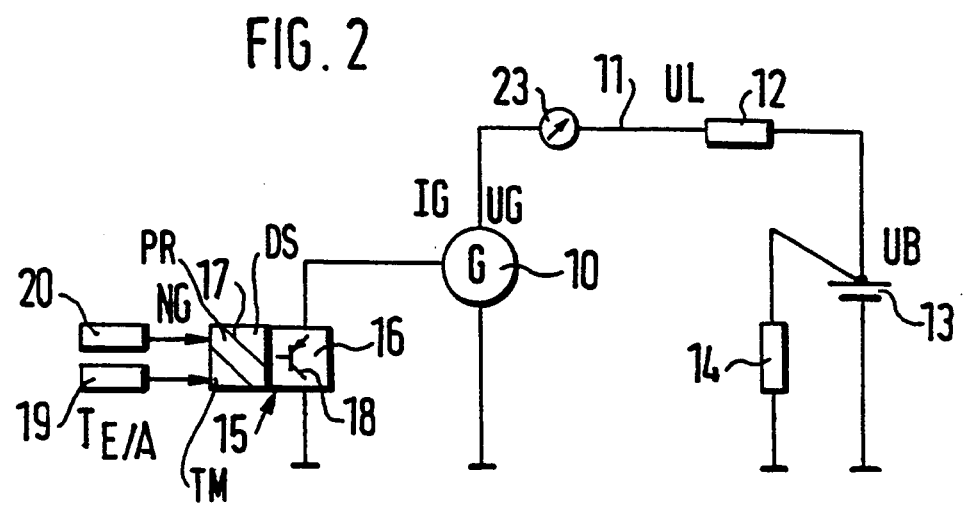
FIG. 2 is a circuit diagram of a power supply system including a voltage regulator according to the invention.

In the example shown in FIG. 2, the output voltage of the alternator equals UG, the battery voltage UB at the positive pole of the battery 13 is equal to the alternator voltage UG, reduced by the voltage drop UL in the resistor 12 of the charging cable 11. The alternator current IG supplied by the alternator 10 can be determined from the measured rate of rotation NG of the alternator and the pulse-duty factor $T_{E/A}$ of the switching transistor 18 which is likewise measured and is decisive for the exciting current.

Figure 3:
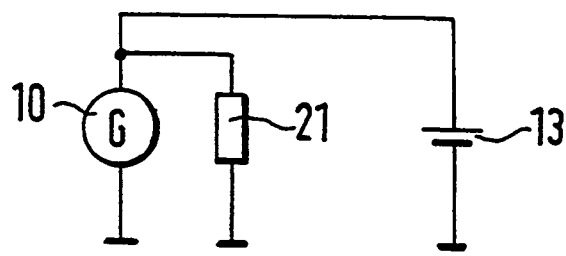
FIGS. 3, 4 and 5 are simple circuit diagrams showing alternative ways of connecting consuming devices with the battery or alternator.
Figure 4:
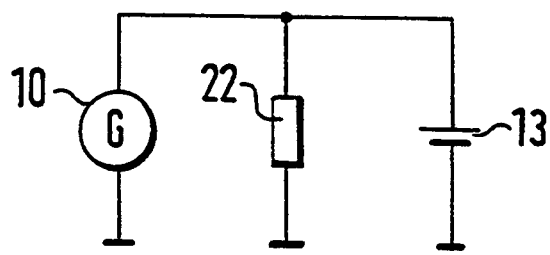
Figure 5:
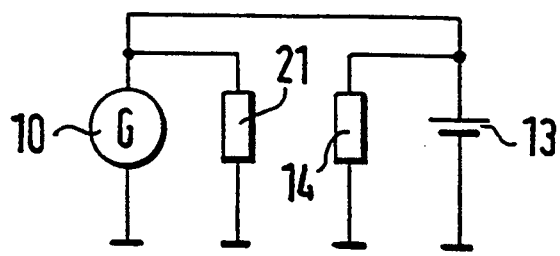

The connection, shown in FIG. 2, of the consuming devices which are symbolized by the resistor 14 is an idealization which is not possible in the actual vehicle mains. Consuming devices which are shown corresponding to FIGS. 3 and 4 as resistors 21 and 22 connected directly to the alternator or between the alternator and the battery and whose other connection is grounded also exist in the actual vehicle mains. A combination of the connection points corresponding to Figure 5 is also not to be ruled out.

For an ideal charging voltage UB to be applied to the battery, the voltage drop between the alternator output and the positive pole of the battery 13 must be compensated for, i.e. the reference value of the alternator output voltage UG at the alternator output must be increased exactly by the value of the voltage drop UL.

For this purpose the voltage drop UL is calculated in the control part 17 of the voltage regulator 15 from the alternator current IG and the value of the resistance 12.

In the ideal case according to FIG. 2 this calculation is effected in a simple manner according to Ohm's law, since the voltage drop UL in the charging cable 11 is equal to the product of the value of the resistance 12 and the current IG flowing through.

The values of the alternator current IG are stored in a storage in the control part 17 of the voltage regulator 15 in a characteristic field as a function of the rate of rotation NG of the alternator and the pulse-duty factor $T_{E/A}$. The value of the resistance 12 of the charging cable 11 is likewise measured once and stored. The values thus stored are used for the calculation of the voltage drop UL.

In the event that the output current of the alternator IG is measured directly by a current sensor 23, this measured value can, of course, be utilized for calculating the voltage drop UL.

In the actual vehicle mains these calculations of the voltage drop UL are to be provided with corrections which are obtained via correspondingly stored correction factors. These correction factors are determined prior to shipment of the regulator and are stored in a storage of the control part 17.

In general the voltage drop UL at the charging cable 11 is accordingly determined by simulation from stored data, possibly with the help of easily measurable quantities or quantities which must be measured anyway.

In the simulation of the battery temperature in the control part 17 of the voltage regulator 15, it is assumed that the voltage regulator 15 and battery 13 heat up in a predetermined manner after driving has begun.

Figure 6:
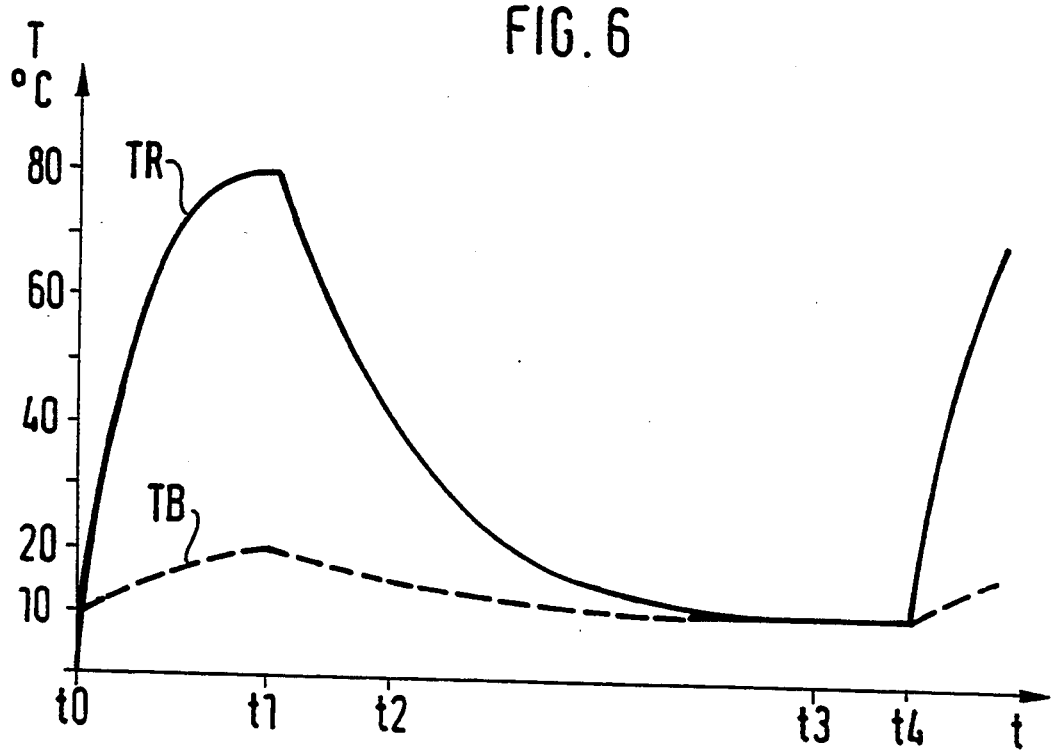
FIG. 6 is a graphical illustration of the relationship of the temperature of the voltage regulator and battery versus time.

A measured temperature curve at the regulator and at the battery is plotted over the time t in FIG. 6. The engine is switched on at a time t0 at a temperature of 10° C.

The temperature TR of the regulator greatly increases during the running of the engine and would level off approximately at a limiting value after a certain period of time. The temperature TB of the battery likewise increases, it would likewise become at least approximately constant after a certain period of time.

In the example according to FIG. 6, however, the engine is switched off after a time t1. Accordingly, both the temperature TR of the regulator and the temperature TB of the battery drop. But the temperature of the regulator at time point t2 has not yet dropped to the temperature of the battery, this only happens after a time t3.

If the engine is switched on again after an additional time t4, the processes repeat themselves corresponding to the time interval between t0 and t1.

Figure 7:
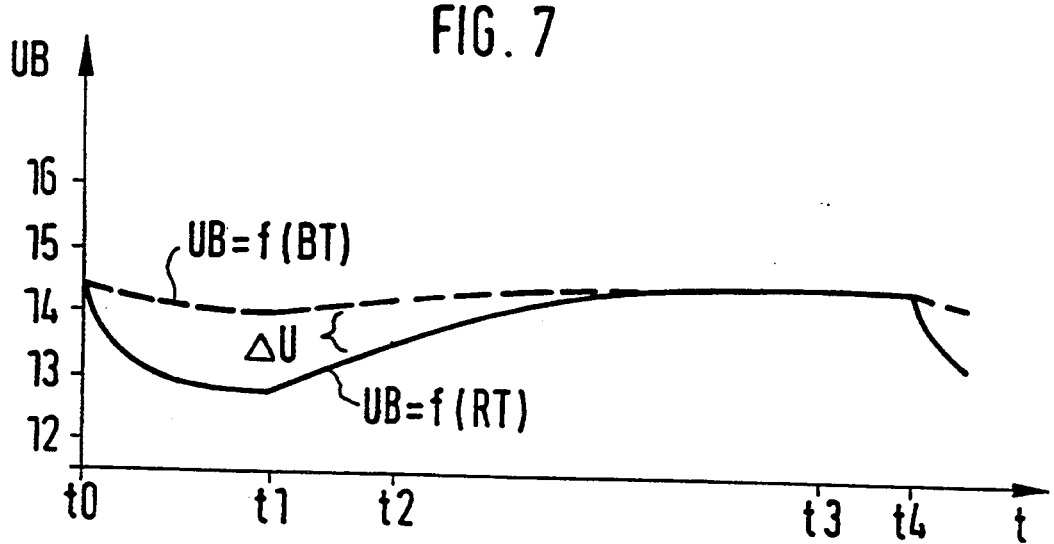
FIG. 7 is a graphical illustration of the dependence of battery voltage on time in a power supply using the voltage regulator according to the invention.

In FIG. 7 the relationship of the battery voltage UB is illustrated over time t for the example known from FIG. 6. The lower curve shows the voltage curve as a function of the regulator temperature, i.e. this voltage curve would be adjusted in a temperature-dependent regulation with a measurement of the temperature at the regulator itself.

The upper curve shows the curve of the battery voltage UB over time t as a function of the battery temperature TB. In both cases, the voltage would drop as the heating increases, but this drop would be much sharper when measuring the temperature at the regulator than when measuring the temperature of the battery. As a result, low voltage values are adjusted when regulating is effected corresponding to the regulator temperature. Therefore, according to the invention, the battery temperature is not measured, but rather is determined through simulation from stored data.

The following consideration also shows that errors would result when using the regulator temperature TR for adjusting the reference value of the alternator voltage UG: when starting again at time point t2, i.e. in the "lukewarm" operating state, there would be a deviation u which would cause an insufficiently high charging voltage. This deviation is caused by the regulator temperature which is higher as a whole and which has not yet dropped to the value of the battery temperature in the time interval between t1 and t2.

To overcome the aforementioned difficulties, according to the invention, the reference value of the alternator voltage UG during operation, i.e. during the time interval t0–t1, is not predetermined corresponding to the regulator temperature, but rather is predetermined corresponding to a temperature which corresponds to a simulated battery temperature and is calculated from a stored characteristic field containing the heating time constant of the battery 13. This heating time constant is determined prior to the shipment of the vehicle and is stored in a storage of the control part 17 of the voltage regulator 15.

At the commencement of simulation, the temperature of the regulator which corresponds to the temperature of the battery at time t0 is used as starting temperature. The battery temperature determined in each simulation or calculation is stored and used as starting temperature for the next calculation. New battery temperatures are thus continuously determined as the engine continues to run. When restarting at time t4, both the regulator and the battery are cooled again to the same temperature and the simulation of the battery temperature is effected in the same way as in the time interval between t0 and t1.

However, when restarting after a time t2, a "lukewarm" operating state exists and the battery temperature and regulator temperature then diverge from one another by a value T. In this case the regulator temperature is not used as starting value for the temperature simulation, rather a new value of the battery temperature at time point t2 is calculated based on the last calculated value of the battery temperature at time point t1, this being effected while taking into account the length of the time interval between t1 and t2 and a cooling time constant for the battery.

The cooling time constant is determined and measured once in the same way as the heating time constant of the battery and is stored in a storage of the control part 17.

Taking into account heating and cooling time constants of the regulator which are likewise measured and stored makes it possible to calculate time t3, after which the regulator is cooled again to the ambient temperature so that its temperature can again be used as a starting temperature for the simulation of the battery temperature insofar as the simulated battery temperature is also at the ambient temperature after this time.

The cooling time constant is determined and measured once in the same way as the heating time constant of the battery and is stored in a storage of the control part 17.

Taking into account heating and cooling time constants of the regulator which are likewise measured and stored makes it possible to calculate time t3, after which the regulator is cooled again to the ambient temperature so that its temperature can again be used as a starting temperature for the simulation of the battery temperature insofar as the simulated battery temperature is also at the ambient temperature after this time.

It will be understood that each of the elements described above, or two or more together, may also find a useful application in other types of constructions differing from the types described above.

While the invention has been illustrated and described as embodied in a voltage regulator for an alternator, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

We claim:

1. A voltage regulator for an alternator, said alternator being connected to a battery (13) with a charging cable and to consuming devices to supply the consuming devices with a voltage, the voltage being determined by a temperature (TB) of the battery (13) according to a predetermined relationship between the temperature (TB) and the voltage for optimum charging of the battery (13), said voltage regulator including a control means (17), said control means (17) having data storage means (DS) for storing data and simulation means (PR) cooperating with the data storage means (DS) so that at least one of the temperature (TB) of the battery (13) and a voltage drop (UL) on the charging cable (11) is calculated by the simulation means (PR) from the stored data in the data storage means (DS), the data storage means being structured to store heating and cooling time constants of the battery (13).

2. A voltage regulator as defined in claim 1, wherein the control means also include a time measuring means (TM) for measuring time periods from at least one of a starting time and shutdown time of the alternator and the simulation means (PR) is structured to perform calculations of the temperature (TB) of the battery (13)

from the stored data in the data storage means (DS) and the measured time periods.

3. A voltage regulator as defined in claim 1, further comprising means for determining a temperature (TR) of the voltage regulator (15) and wherein the control means uses the temperature (TR) of the voltage regulator in calculating the temperature of the battery.

4. A voltage regulator as defined in claim 1, wherein the data storage means is also structured to store heating and cooling time constants of the voltage regulator (13).

5. A voltage regulator for an alternator, said alternator being connected to a battery (13) with a charging cable and to consuming devices to supply the consuming devices with a voltage, the voltage being determined by a temperature (TB) of the battery (13) according to a predetermined relationship between the temperature (TB) and the voltage for optimum charging of the battery (13), said voltage regulator including a control means (17), said control means (17) having data storage means (DS) for storing data and simulation means (PR) cooperating with the data storage means so that at least one of the temperature (TB) of the battery (13) and a voltage drop (UL) on the charging cable (11) is calculated by the simulation means (PR) from the stored data in the data storage means (DS), a switching transistor connected to said alternator for controlling an alternator current delivered by the alternator to the battery via the charging cable, means for measuring an alternator rotation speed (NG) and means for measuring a pulse-duty factor ($T_{E/A}$) of the switching transistor (18), said means for measuring a pulse-duty factor ($T_{E/A}$) and said means for measuring an alternator rotation speed (NG) being connected to the control means, and wherein the data storage means is structured to store an alternator current determined from measured values of the alternator rotation speed (NG) and the pulse-duty factor ($T_{E/A}$) and a resistance in the charging cable so that the simulating means (PR) can be structured to determine the voltage drop (UL) from the resistance in the charging cable and the alternator current.

6. Method of controlling a voltage supplied to a battery connected to an alternator by a charging cable having a resistance, said method comprising:
   a) determining a relationship between a voltage applied to a battery connected to an alternator by a charging cable for charging the battery and a temperature of the battery for optimum charging of the battery;
   b) determining at least one of the temperature (TB) of the battery and a voltage drop (UL) in the charging cable by simulation in a control means from stored data in the control means, wherein the stored data include the heating and cooling time constants of the battery and the voltage regulator;
   c) controlling the voltage produced by the alternator according to at least one of the temperature of the battery and the voltage drop determined in step b) so that the voltage applied to the battery is in accordance with the relationship of step a);
   d) determining both the temperature (TB) of the battery and the voltage drop (UL) in the charging cable in step b); and
   e) measuring time from at least one of a starting and shutdown of the alternator for use in the simulation of the determining step b).

7. Method as defined in claim 6, wherein the stored data include the heating and cooling time constants of the battery and the voltage regulator, and further comprising measuring time from at least one of a starting and shutdown of the alternator for use in the simulation of the determining step b).

8. Method as defined in claim 6, further comprising the steps of measuring an alternator rotation speed and a pulse-duty factor of a switching transistor of a voltage regulator controlling an alternator current of the alternator; determining the alternator current from measured values of the alternator rotation speed and the pulse-duty factor; and determining the voltage drop in the charging cable as a product of the alternator current and a resistance of the charge cable.

9. Method as defined in claim 8, further comprising taking other correction factors into account in determining of the voltage drop (UL).

* * * * *